F. A. VAN ORDEN.
TRAP NEST.
APPLICATION FILED AUG. 9, 1921.
1,434,271.
Patented Oct. 31, 1922.
5 SHEETS—SHEET 4.
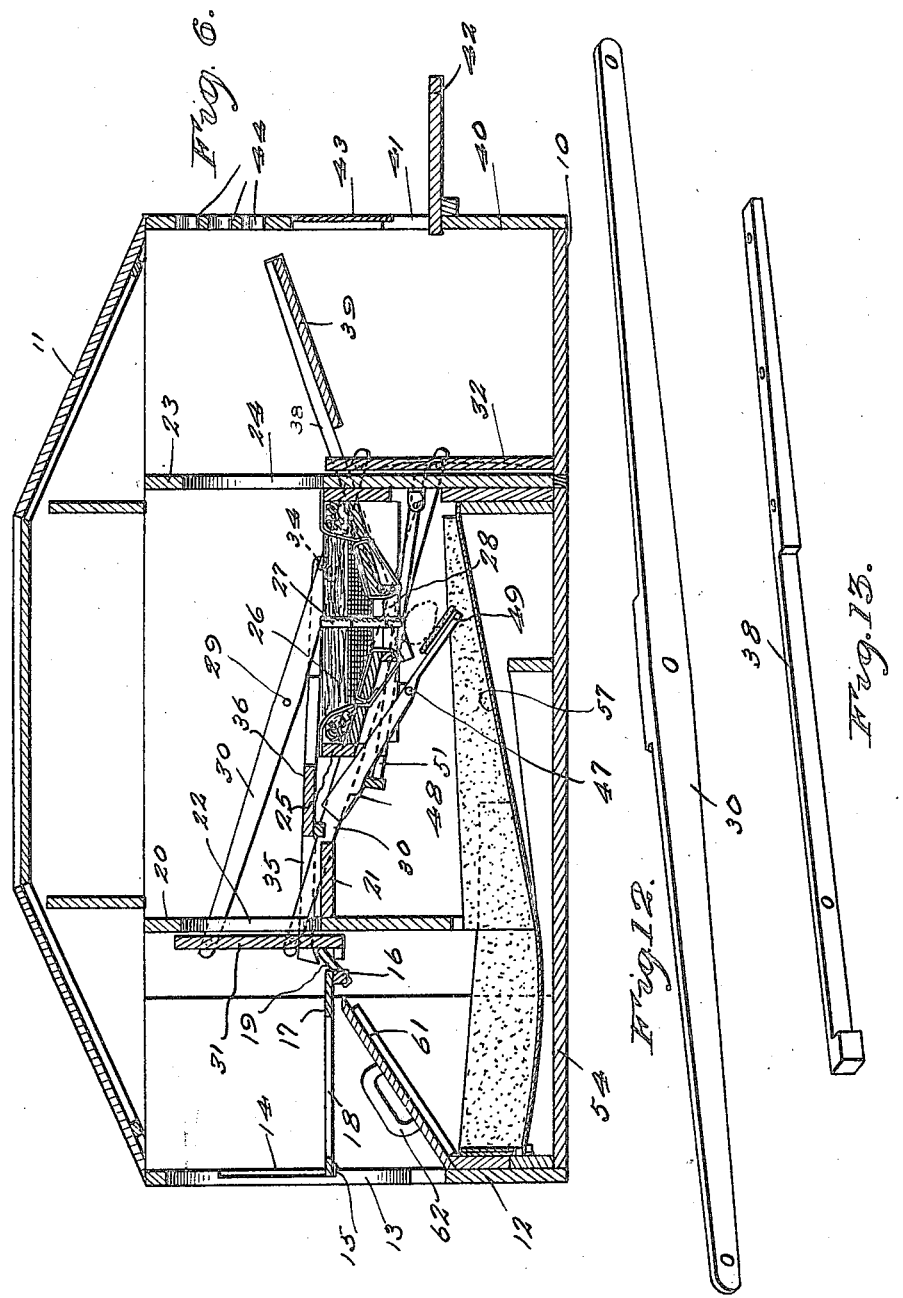
Fred A. Van Orden INVENTOR
WITNESSES
BY
ATTORNEY F. A. VAN ORDEN.
TRAP NEST.
APPLICATION FILED AUG. 9, 1921.
1,434,271.
Patented Oct. 31, 1922.
5 SHEETS—SHEET 5.
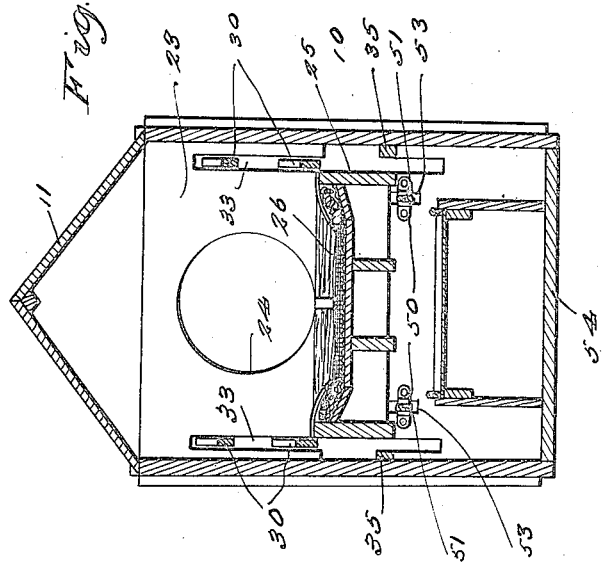
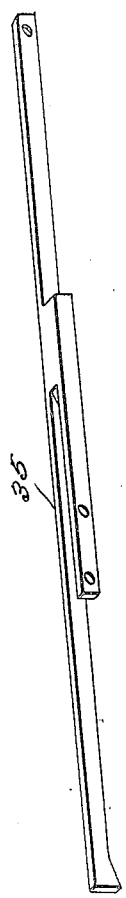
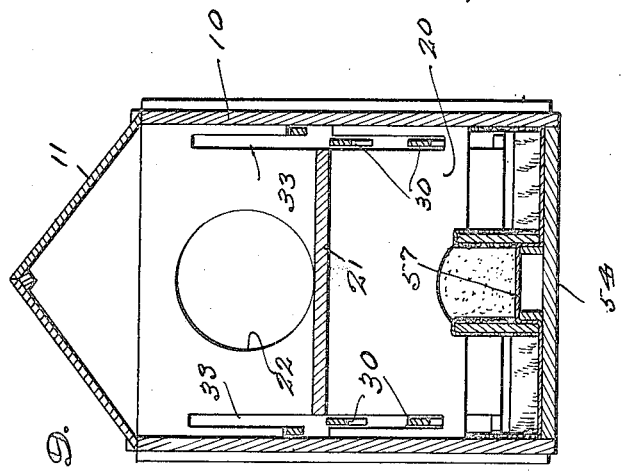
Fred A. Van Orden INVENTOR
BY
WITNESSES
ATTORNEY Patented Oct. 31, 1922.

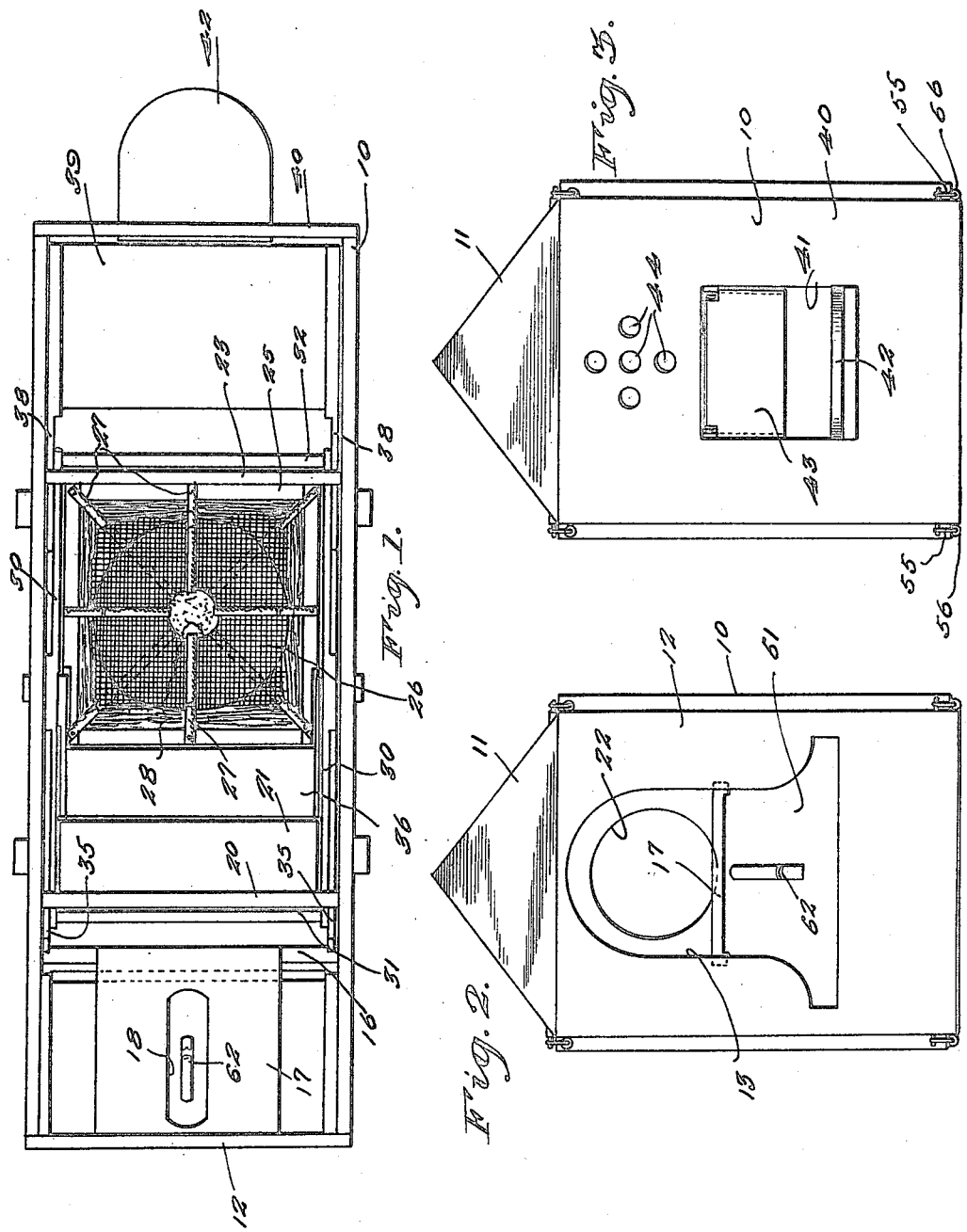

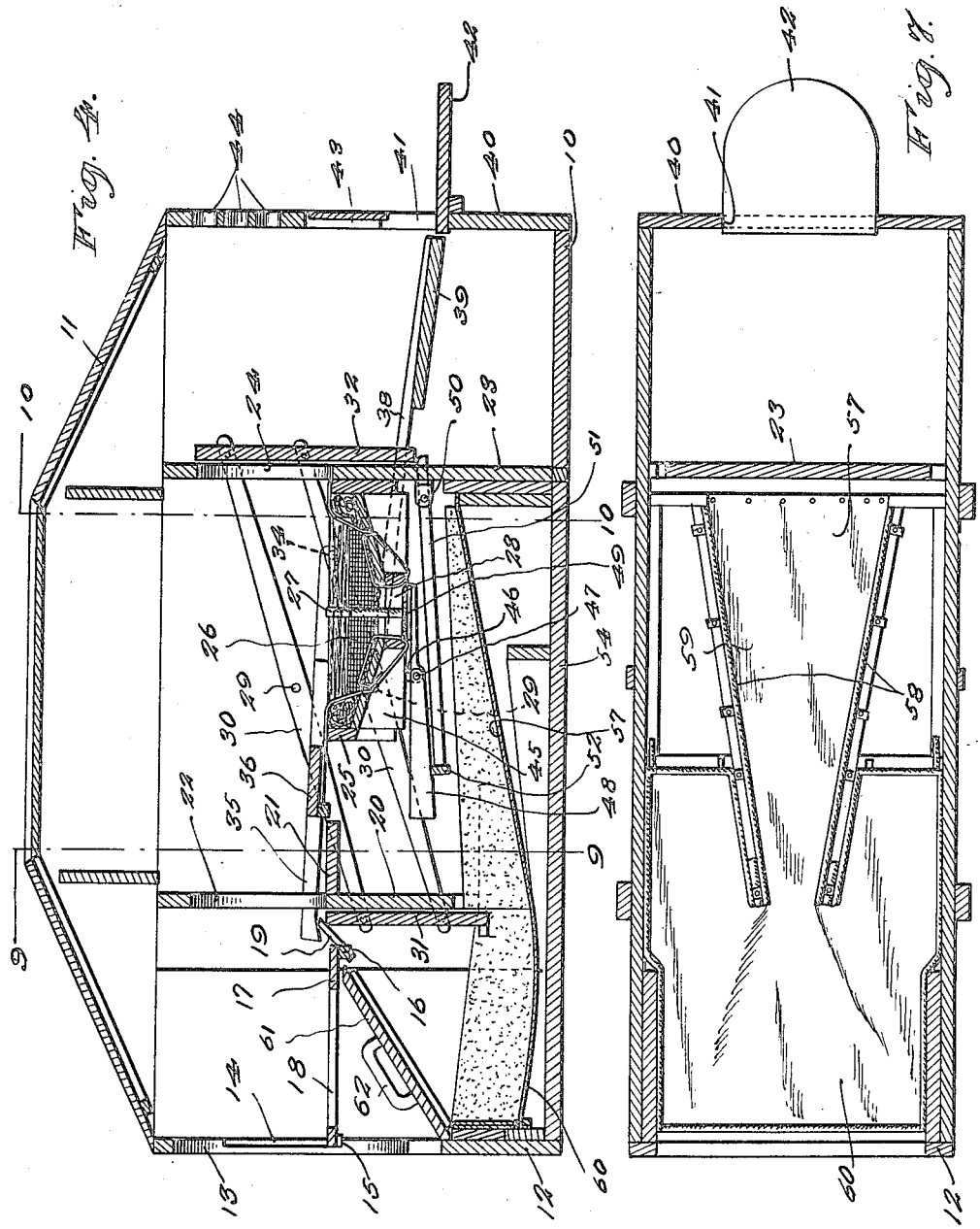

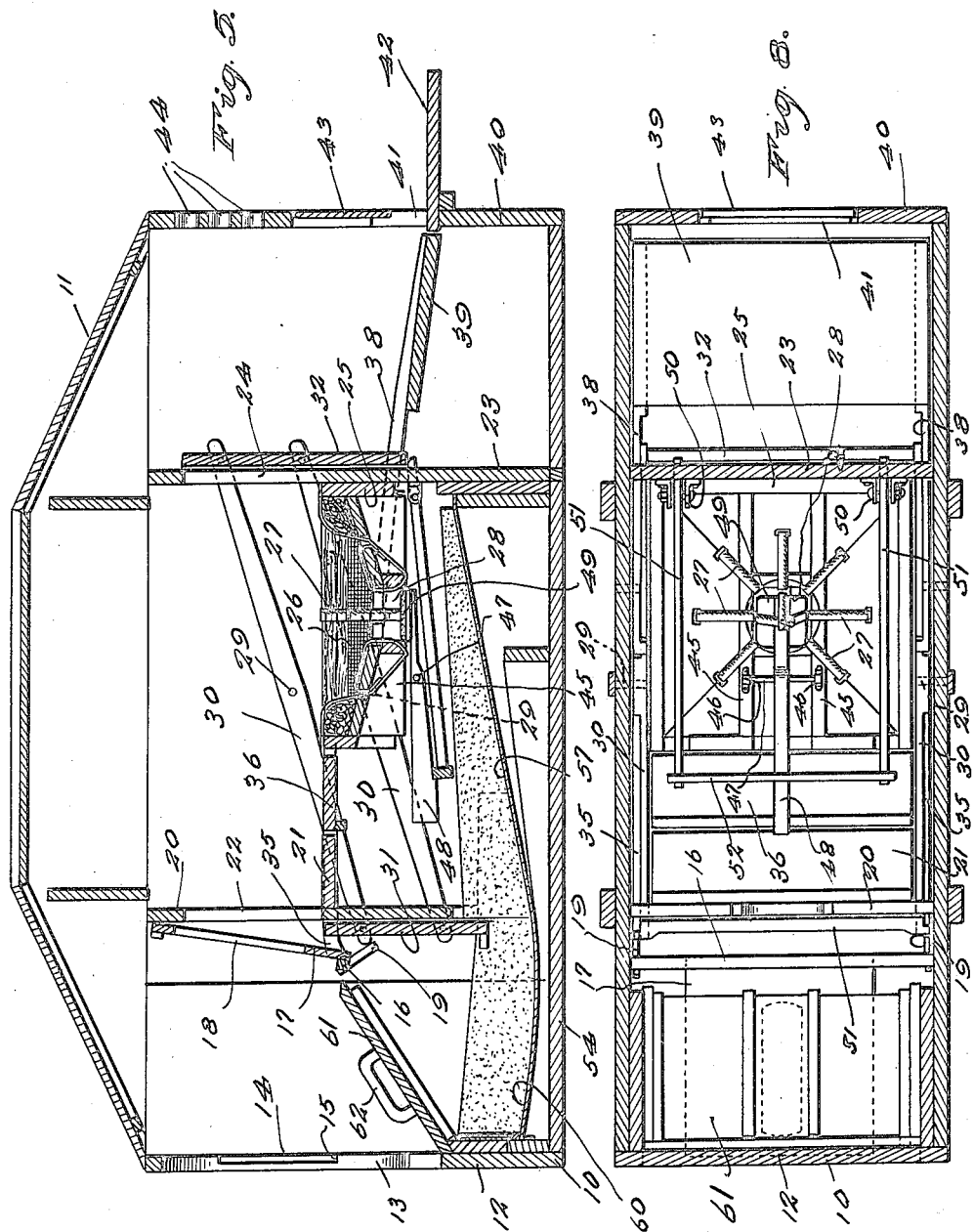

1,434,271

UNITED STATES PATENT OFFICE.

FRED A. VAN ORDEN, OF NORTH WHITE LAKE, NEW YORK.

TRAP NEST.

Application filed August 9, 1921. Serial No. 490,964.

*To all whom it may concern:*

Be it known that I, FRED A. VAN ORDEN, a citizen of the United States, residing at North White Lake, in the county of Sullivan and State of New York, have invented new and useful Improvements in Trap Nests, of which the following is a specification.

This invention relates to trap nests used by poultrymen and has for its object the provision of a novel trap nest which is designed to be interposed within or to act as a passageway between separate pens for hens, it being designed that the hens will pass into the device and lay and that they will subsequently pass out of the device into another pen whereby the owner may readily ascertain which hens are or are not productive.

An important object is the provision of a trap nest of this character in which the action is entirely automatic, doors being provided for controlling entrance to and exit from the device, these doors being operated automatically by the passage of a hen through the device, certain movable elements being provided which operate by weight of the hen and another movable element being controlled by the weight of the egg laid within the nest proper.

Another object is the provision of a device of this character in which the parts will be automatically reset in initial position when the hen leaves the device so that no attention will be required by the operator or owner of the nest.

Still another object is the provision of a device of this character which is provided with a novel egg receptacle into which the eggs pass as they are laid and which is so constructed that the eggs will roll upon a padded surface to one end of the device where they may be readily apparent.

A further object is the provision of a trap nest of this character which is so constructed that when a hen enters other hens will be prevented from following and disturbing the hens intending to lay while at the same time the hen within the device may leave again by the entrance if she should so desire, or at any time before the egg is laid, the trap not being sprung until the egg is actually laid.

A still further object is the provision of a device of this character in which the egg when laid will immediately pass into a suitable receptacle to which the hen does not have access, the advantage being that egg eating will be absolutely impossible, breakage of the eggs on account of trampling will be obviated, and the eggs will be maintained clean.

An additional object is the provision of a device of this character which will be comparatively simple and inexpensive in manufacture, highly efficient in use, durable in service and a general improvement in the art.

With the above and other objects and advantages in view, the invention consists in the details of construction to be hereinafter more fully described and claimed and illustrated in the accompanying drawings in which, Figure 1 is a plan view of my device with the cover removed, Figure 2 is an elevation of one end, Figure 3 is an elevation of the opposite end, Figure 4 is a longitudinal sectional view showing the parts in initial position, Figure 5 is a similar view showing certain of the parts as moved by the entrance of a hen into the device, Figure 6 is a similar view showing the action when an egg is laid, Figure 7 is a horizontal sectional view showing the egg receiving compartment in plan, Figure 8 is a horizontal sectional view taken on the same line but looking upwardly, Figure 9 is a cross sectional view on the line 9—9 of Figure 4.

Figure 10 is a cross-sectional view on the line 10—10 of Figure 4.

Figure 11 is a detail perspective view of one of the operating bars.

Figure 12 is a similar view of another bar and

Figure 13 is a perspective view of still another one of the operating bars.

Referring more particularly to the drawings, I have shown my device as comprising a rectangular casing 10 which is provided with a removable cover 11 of ridge shape whereby to discourage roosting upon the cover with the attendant or subsequent objectionable conditions. This cover may be hinged or may be held in position by means of a plurality of hooks and is removable for the purpose of permitting access to the interior of the device for the purpose of making repairs or for cleaning it out.

One end 12 of the casing is provided with an entrance opening 13 which has its side edges rabbeted, as shown at 14, for the purpose of providing shoulders 15 at the bottom of the opening. Extending transversely of this end of the casing is a rod or shaft 16 upon which is secured a platform 17 which normally is disposed in horizontal position immediately inside of the opening 13 with its free end engaging the shoulders 15. This platform is shown as having its central portion open, as indicated at 18. Near its ends the rod or shaft 16 carries arms 19 for a purpose to be described.

Extending transversely of the casing at a point spaced from the end 12 is a partition 20 at the lower portion of which is secured a rigid board 21 which is horizontally disposed. The partition 20 is formed with an opening 22 for the passage of a hen therethrough. Extending transversely of the casing at a point spaced considerably from the partition 20 is a similar partition 23 having an opening 24. The space between the two partitions 20 and 13 is the laying compartment and secured within this space is the nest proper which is formed as a rectangular frame 25 within which is secured material 26 which I have shown as being straw or hay covered preferably with matting. This nest material is held in place by a plurality of straps 27 which are formed of burlap or other fabric and which may be removed when it is necessary to renew the nest material in the event that the same should become vermin infested and soiled excessively. This nest is formed centrally with a hole 28 for the outlet of eggs deposited within the nest.

Pivoted at 29 against the inner sides of the casing at the center thereof, are spaced bars 30 arranged in pairs and these bars carry at one end a door 31 which moves vertically and which is adapted to close the opening 22 in the partition 20. At their other ends the bars 30 carry a similar door 32 which is adapted to close the opening 24 in the partition 23. It will be seen that the partitions 20 and 13 are formed with vertical slots 33 for accommodating the movement of the bars 30.

Pivoted at 34 upon the inner sides of the casing are bars 35 upon the intermediate portions of which is secured a treadle 36 which bridges the space between the rigid board 21 and the adjacent end of the nest frame 25. The bars 35 project beyond the partition 20 and seat upon the arms 19 so that when a hen enters the laying compartment and steps upon the treadle 36 the resultant downward movement of the bars 35 engaging the arms 19 will cause rotation of the rod or shaft 16 and consequent upward swinging movement of the platform 17.

Pivoted upon the inner sides of the casing are bars 38 upon the ends of which is secured a treadle platform 39 which is located between the partition 23 and the adjacent end 40 of the casing. The ends of the bars 38 engage against the undersides of the lowermost bars 30 so that when weight is placed upon the platform 39 the resultant movement of the bars 38 will cause the bars 30 to move so that the door 31 will move downwardly and the door 32 move upwardly. The end 40 of the casing is provided with an exit opening 41 which leads out onto a small platform 42. Pivoted within the exit opening 41 is a drop door 43 which can open outwardly only. It is also preferable that this end 40 of the casing be provided above the exit opening 41 with a plurality of holes 44 which are for purposes of ventilation.

On the underside of the nest frame 25 are spaced longitudinal cleats 45 upon which are secured bearings 46 within which is journaled a transverse pivot rod 47 which extends through a lever 48 which is provided at one end with a flat head 49 which constitutes a treadle and which is located immediately beneath the hole 28 in the nest. This treadle head 49 is padded so as not to cause cracking of eggs falling thereonto. Secured against the forward side of the partition 23 are brackets 50 upon which are pivoted the arms 51 of a U-shaped yoke 52 which is engaged by the lever 48 at the end of the latter opposite the treadle head 49 and it should be noted that this end of the lever is relatively large so that its weight will operate normally to hold the treadle head 49 against the bottom of the nest. The free ends of the yoke arms 51 pass through slots 53 in the partition 23 and engage against the lower edge of the door 32 for the purpose of holding this door initially elevated.

The casing has a portion 54 of its bottom removable but normally held in position by means of suitable hooks and eyes 55 and 56 or by means of some other similar fastening means. This removable bottom extends from the partition 23 to the end 12 of the casing and secured upon this bottom is an egg chute 57 which is inclined and which has converging sides 58. The egg chute is padded, as shown at 59, and the portion of the removable bottom near the discharge end of this egg chute is also padded, as indicated at 60. This padded bottom portion is somewhat inclined upwardly at its end farthest from the discharge end of the egg chute for the purpose of checking the momentum of eggs falling from the chute. Beneath the platform 17 I provide a removable cover plate 61 having a suitable handle 62 and this cover may be removed for the purpose of permitting access to the eggs accumulated within the device.

The operation is as follows:

Initially the parts are arranged as shown in Figure 4, that is the bars 30 are in such position that the door 31 will be in its lowermost position in non-obstructing relation to the opening 22 in the partition 20 whereupon the door 32 will be in its highest position closing the opening 24 in the partition 23, this latter mentioned door being held elevated by engagement of the free ends of the yoke arms 51 with the lower edge of the door. When a hen desires to lay she will enter through the opening 13 and pass from the platform 17 through the opening 22 onto the rigid board 21 and must step upon the treadle 36 in order to reach the nest. When the hen steps upon the treadle 36 the weight will of course force this treadle downwardly whereupon the bars 35 engaging the arms 19 will partially rotate the rod or shaft 16 and this will result in upward swinging movement of the platform 17 which will close the opening 22 in the partition 20 so that another hen could not enter the nest. The hen of course lays the egg in the nest and the egg will drop through the hole 28 onto the treadle head 49 and this will result in swinging the lever 48 whereupon the yoke 52 will be swung and this will result in movement of the free ends of the yoke arms 51 out of engagement with the lower edge of the door 32. The door 32 will then drop and uncover the opening 24 while the door 31 will move upwardly and close the opening 22. When the door 31 moves upwardly the small projections at the lower edge thereof will engage the arms 19 and throw the member 17 into horizontal position. The way is then clear for the hen to leave the nest which she does by passing through the opening 24. In leaving the hen must step upon the platform 39 which will then descend and owing to the engagement of the bars 38 of this platform 39 with the lower ones of the bars 30 it will be seen that the bars 30 will be swung which will result in moving the door 31 to its lowermost position and the door 32 to its uppermost position so that the entire mechanism will be reset ready for the next hen. The egg of course drops from the treadle head 49 into the egg chute 57 and rolls down onto the padded bottom at the end beneath the cover 61. As soon as the egg drops from the treadle 49 the lever 48 and yoke 52 return to normal position with the ends of the yoke arms 51 reengaging beneath the lower edge of the door 32 for holding the parts in their normal position. As the treadle 39 descends with the hen it will be seen that upon reaching the level of the exit platform 42 the hen may step out through the exit opening 41. This cycle of operations is repeated every time that a hen enters the device and lays an egg.

In the actual utilization of my device it will be apparent that the nest should be used as a means of communication between two separate pens in one of which the hens would be placed in the morning. As the hens lay they cannot return to the first pen but will have to pass through the device into the other pen so that the attendant may know by inspecting the second pen which hens are productive, and which are not. Of course any checking system may be employed but such is not mentioned in detail as forming no part of the present invention.

When a hen enters the device she may walk around and inspect the surroundings and she may leave again by the entrance at any time before she lays an egg. As stated above, however, the minute a hen enters the device, the entrance door automatically closes so as to prevent any other hens from following her into the nest and disturbing her. The trap structure is not sprung until an egg is actually laid and as the trap is sprung the hen could not possibly leave by the entrance opening but must pass out the exit opening at the rear of the device. It will also be seen that just as soon as an egg is laid it passes through the opening in the bottom of the nest proper into the receptacle provided for the purpose so that a hen cannot eat the egg and cannot break it by trampling upon it. Another feature of advantage is that the egg will be kept clean as it immediately passes from the nest proper so that the hen cannot put dirty or muddy feet upon the egg.

From the foregoing description and a study of the drawings it will be apparent that I have thus provided a simple trap nest structure which will be entirely automatic in action and which is reset by the hens themselves in passing from the device after laying. It will be observed that owing to the simplicity of the invention there is practically nothing to get out of order and that the device should consequently have a long life and give thorough satisfaction.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A device of the character described comprising an elongated rectangular casing having one end provided with an entrance opening and the other end provided with an exit opening, a pair of spaced partitions provided with openings, a nest between the partitions, pairs of bars pivoted upon the inner sides of the casing, doors carried by said bars and movable vertically to cover and uncover the openings in the partitions, other bars pivoted upon the inner sides of the casing and engaging said first named bars whereby to effect movement of the latter, and a treadle member carried by said last named bars and located between the exit end of the casing and the adjacent partition.

2. A device of the character described comprising an elongated rectangular casing having one end provided with an entrance opening and the other end provided with an exit opening, a pair of spaced partitions provided with openings, a nest between the partitions, pairs of bars pivoted upon the inner sides of the casing, doors carried by said bars and movable vertically to cover and uncover the openings in the partitions, other bars pivoted upon the inner sides of the casing and engaging said first named bars whereby to effect movement of the latter, a treadle member carried by said last named bars and located between the exit end of the casing and the adjacent partition, a platform member bridging the space between the entrance end and the adjacent partition, and a treadle member located in advance of the nest and operatively connected with said platform.

In testimony whereof I affix my signature.

FRED A. VAN ORDEN.